United States Patent
Wu

(10) Patent No.: US 10,057,063 B2
(45) Date of Patent: *Aug. 21, 2018

(54) DECRYPTION DEVICE, METHOD, AND CIRCUIT

(71) Applicant: Realtek Semiconductor Corporation, Hsinchu (TW)

(72) Inventor: Tzung-Juei Wu, Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 210 days.

This patent is subject to a terminal disclaimer.

(21) Appl. No.: 15/134,366

(22) Filed: Apr. 20, 2016

(65) Prior Publication Data

US 2017/0099141 A1    Apr. 6, 2017

(30) Foreign Application Priority Data

Oct. 6, 2015  (TW) .............................. 104132891 A

(51) Int. Cl.
    *H04L 9/00*   (2006.01)
    *H04L 9/30*   (2006.01)
    *H04L 9/06*   (2006.01)
    *H04L 9/08*   (2006.01)

(52) U.S. Cl.
    CPC ............ *H04L 9/302* (2013.01); *H04L 9/0625* (2013.01); *H04L 9/0825* (2013.01)

(58) Field of Classification Search
    CPC ...... H04L 9/302; H04L 9/0825; H04L 9/0625
    USPC ......................................................... 380/45
    See application file for complete search history.

(56) References Cited

U.S. PATENT DOCUMENTS

| 6,748,410 | B1 | 6/2004 | Gressel et al. |
| 7,269,261 | B1 | 9/2007 | Jennings |
| 2009/0180610 | A1* | 7/2009 | Tobergte ................. G06F 7/723 380/28 |
| 2009/0228717 | A1 | 9/2009 | Futa et al. |
| 2010/0064142 | A1 | 3/2010 | Matsuzaki et al. |
| 2010/0257318 | A1* | 10/2010 | Aciicmez ............ G06F 12/0808 711/125 |
| 2011/0194694 | A1 | 8/2011 | Struik |
| 2012/0221618 | A1 | 8/2012 | Feix et al. |
| 2013/0016828 | A1 | 1/2013 | Teglia |
| 2014/0129604 | A1* | 5/2014 | Clavier ................... G06F 17/10 708/606 |
| 2014/0281573 | A1 | 9/2014 | Jaffe |
| 2017/0099142 | A1 | 4/2017 | Wu |

FOREIGN PATENT DOCUMENTS

CN          101292274 A     10/2008

* cited by examiner

*Primary Examiner* — Mohammad W Reza
(74) *Attorney, Agent, or Firm* — CKC & Partners Co., Ltd.

(57) ABSTRACT

A decryption method includes receiving encrypted data, in which the encrypted data is encrypted according to an RSA public key; and performing a plurality of operations in sequence according to an RSA private key and the encrypted data to acquire a decrypted data. The operations include a plurality of decryption operations and at least one false operation. The decryption operations include at least one decryption multiplication operation and at least one decryption square calculation, and the at least one false operation includes at least one of at least one first false multiplication operation and at least one first false square calculation.

16 Claims, 6 Drawing Sheets

US 10,057,063 B2

DECRYPTION DEVICE, METHOD, AND CIRCUIT

RELATED APPLICATIONS

This application claims priority to Taiwan Application Serial Number 104132891 filed Oct. 6, 2015, which is herein incorporated by reference.

BACKGROUND

Technical Field

The present disclosure relates to a device, a method and a circuit. More particularly, the present disclosure relates to a decryption device, a decryption method and a circuit.

Description of Related Art

An RSA encryption algorithm is an asymmetric encryption algorithm. An encryption device can use an RSA public key to encrypt a message. After receiving the encrypted message, a decryption device can use an RSA private key to decrypt the encrypted message.

However, when the decryption device performs the decryption, an attacker may measure a relevant signal (e.g., a voltage or power) of the decryption device to estimate the operation performed by the decryption device and then to acquire the RSA private key used in the decryption device.

Therefore, a decryption method capable of defending against such a sideband attack is desired.

SUMMARY

One aspect of the present disclosure is related to a decryption method. In accordance with one embodiment of the present disclosure, the decryption method includes receiving encrypted data, in which the encrypted data is encrypted according to an RSA public key, and performing a plurality of operations in sequence, according to an RSA private key and the encrypted data, to acquire a decrypted data. The operations include a plurality of decryption operations and at least one false operation. The decryption operations include at least one decryption multiplication operation and at least one decryption square calculation, and the at least one false operation includes at least one of at least one first false multiplication operation and at least one first false square calculation.

Another aspect of the present disclosure relates to a decryption device. In accordance with one embodiment of the present disclosure, the decryption device includes a communication module and a decryption component. The decryption component is configured for receiving, through the communication module, encrypted data, in which the encrypted data is encrypted according to an RSA public key, and performing a plurality of operations in sequence, according to an RSA private key and the encrypted data, to acquire a decrypted data. The operations include a plurality of decryption operations and at least one false operation. The decryption operations include at least one decryption multiplication operation and at least one decryption square calculation, and the at least one false operation includes at least one of at least one first false multiplication operation and at least one first false square calculation.

Another aspect of the present disclosure is related to a decryption circuit. In accordance with one embodiment of the present disclosure, the decryption circuit includes an operating circuit and a control circuit. The operating circuit is configured for performing a plurality of operations in sequence according to an RSA private key and encrypted data to generate a plurality of operation results. The operations include a plurality of decryption operations and at least one false operation, the decryption operations comprise at least one decryption multiplication operation and at least one decryption square calculation, and the at least one false operation includes at least one first false multiplication operation and at least one first false square calculation.

Through an application of one embodiment described above, a sideband attack during the decryption operation can be defended.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
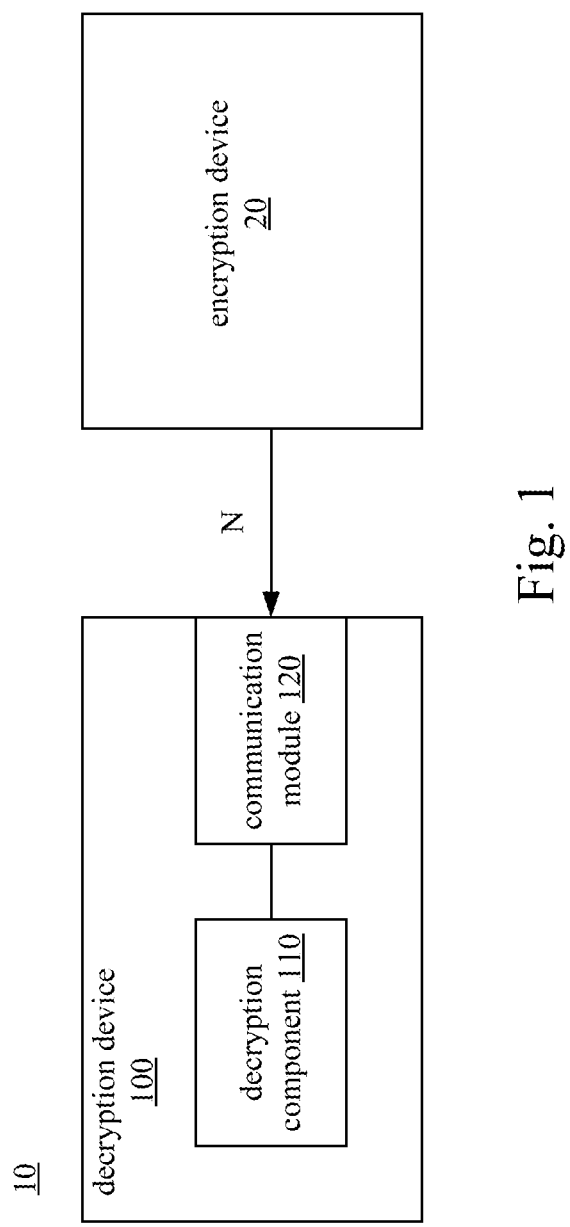
FIG. 1 is a schematic block diagram of a decryption system in accordance with one embodiment of the present disclosure.

FIG. 1 is a schematic block diagram of a decryption system 10 in accordance with one embodiment of the present disclosure. The decryption system 10 includes a decryption device 100 and an encryption device 20. The encryption device 20 is configured to encrypt an original message according to an RSA public key, and then to generate encrypted data N. The decryption device 100 is configured to receive the encrypted data N and decrypt the encrypted data N.

The decryption device 100 includes a decryption component 110 and a communication module 120 connected to each other. The communication module 120 is configured to receive the encrypted data N from the encryption device 20 and to transmit the encrypted data N to the decryption component 110. The decryption component 110 is configured to decrypt the encrypted data N to obtain the original message.

In one embodiment, the decryption component 110 can be realized by a central processor, a microprocessor, or another suitable calculating device capable of performing specific commands or specific computer programs, or can be realized by a circuit. In one embodiment, the communication module 120 can be realized by a wired or wireless communication component.

Figure 2:
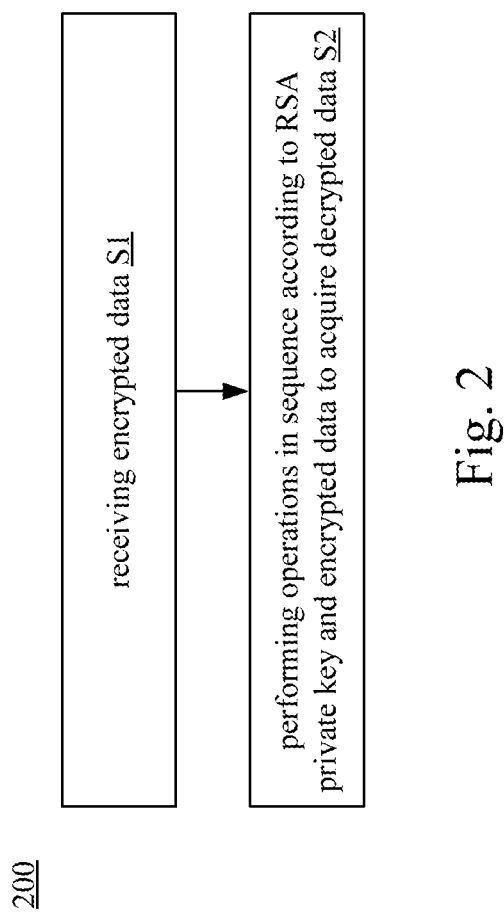
FIG. 2 is a flowchart of a decryption method in accordance with one embodiment of the present disclosure.

Referring to FIG. 2, a decryption method 200 as shown in FIG. 2 can be applied to a device having a structure that is the same as or similar to the decryption device 100 shown in FIG. 1. In the following paragraphs, the embodiment shown in FIG. 1 is used as an example to describe the decryption method 200 according to an embodiment of the present disclosure.

In step S1, the decryption component 110 receives encrypted data N from the encryption device 20 through the communication module 120. The encrypted data N is encrypted by an RSA public key.

In step S2, the decryption component 110 decrypts the encrypted data N to obtain decrypted data (i.e., the original message before being encrypted). The decryption component 110 performs a plurality of operations in sequence according to an RSA private key, corresponding to the RSA public key, and the encrypted data N to acquire the decrypted data. In one embodiment, the operations may include a plurality of decryption operations and at least one first false operation (details are described below). The decryption operations can be configured to decrypt the encrypted data N to generate the decrypted data. In one embodiment, the decryption operations include at least one decryption multiplication operation and at least one decryption square operation.

An example is described with reference to Table 1. For this example, it is supposed that a value of the RSA private key is 123, and a binary form of the RSA private key is 2'1111011. In the decryption procedure, a decryption multiplication operation and/or a decryption square operation are/is performed corresponding to each of the bits sequentially. In another aspect, in the decryption procedure, the decryption component 110 calculates $N^{\wedge}123=((((( N^{\wedge}2)*N)^{\wedge}2*N)^{\wedge}2)^{\wedge}2*N)^{\wedge}2*N$ to acquire the decrypted data.

TABLE 1

| | binary form | | | | | | |
|---|---|---|---|---|---|---|---|
| | 1 | 1 | 1 | 1 | 0 | 1 | 1 |
| multiplication operation | — | ✓ | ✓ | ✓ | — | ✓ | ✓ |
| square operation | ✓ | ✓ | ✓ | ✓ | ✓ | ✓ | — |

In the decryption procedure, the number of times that the multiplication operations are performed is related to the number of "1's" in the binary form of the RSA private key. For example, in Table 1, not counting the first bit from the left (i.e., the most significant bit, MSB), there are five "1's" in the binary form of the RSA private key, and therefore, the multiplication operations are performed five times in the decryption procedure.

In addition, the number of times that the square operations are performed corresponds to a binary bit length of the RSA private key. For example, since the binary bit length of the RSA private key is 7, the square operation is performed 7−1=6 times in the decryption procedure.

In one embodiment, the at least one first false operation is not used in generating the decrypted data. In one embodiment, the at least one first false operation is performed before, between or after the decryption operations are performed. In one embodiment, the at least one first false operation may include at least one first false multiplication operation and/or at least one first false square operation.

In one embodiment, measured characteristic values (e.g., a2 in FIG. 3) of the first false multiplication operation and the decryption multiplication operation are identical, and measured characteristic values (e.g., a1 in FIG. 3) of the first false square operation and the decryption square operation are identical. The measured characteristic values indicate characteristic values of relevant signals (e.g., power, current, voltage, temperature, frequency) measured at the decryption device 100 performing an operation.

Through the operations above, it is difficult for an attacker to acquire the decryption operations and the corresponding RSA private key through measuring a relevant signal of the decryption device 100.

In one embodiment, a square operation or a first false square operation is performed between two of the first false multiplication operations, or between one of the first false multiplication operations and one of the multiplication operations. In such a manner, after the first false multiplication operations or the first false square operations are inserted, presentation of an abnormal sequence can be avoided so as to prevent an attacker from acquiring additional information.

In the paragraphs below, an operative example is provided with reference to FIG. 3. In this operative example, the value of the RSA private key is 123, and a binary form of the RSA private key is 2'1111011. During the decryption procedure, the decryption component 110 sequentially performs the operations in the operation sequence 2, in which the operations in the operation sequence 2 include decryption square operations SQ, decryption multiplication operations MT, first false square operation SQ", and first false multiplication operation MT". The decryption component 110 generates the decryption data by sequentially performing the decryption operations in DCR1-DCR3. An of the first false operations in DUM1 performed before the decryption operations in DCR1, the first false operations in DUM2 performed between the decryption operations in DCR1, DCR2, and the first false operations in DUM3 performed after the decryption operations in DCR3 are not used to generate the decryption data.

In this operative embodiment, even if an attacker measures the relevant signals of the decryption device 100, it is difficult for the attacker to identify the decryption operations in DCR1-DCR3 and the RSA private key corresponding thereto.

Figure 4:
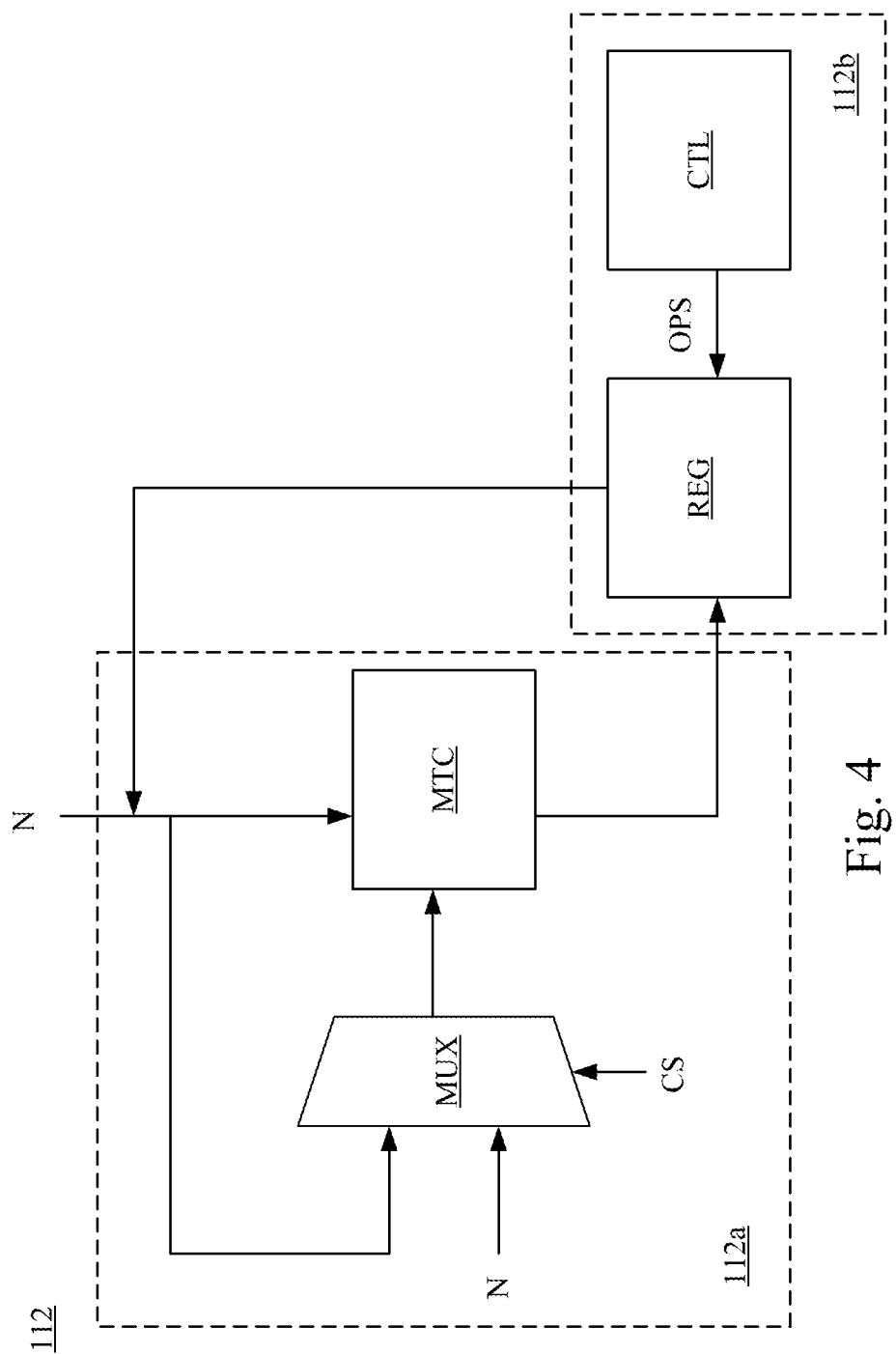
FIG. 4 is a schematic block diagram of a decryption circuit in accordance with one embodiment of the present disclosure.

In one embodiment, the decryption component 110 may include a decryption circuit 112 to perform the decryption procedure described above. FIG. 4 is a schematic block diagram of the decryption circuit 112 in accordance with one embodiment of the present disclosure. The decryption circuit 112 includes an operating circuit 112a and a control circuit 112b. The operating circuit 112a is configured to receive encrypted data N, and to perform a plurality of operations according to an RSA private key and the encrypted data N to generate a plurality of operation results, in which the operations include a plurality of decryption operations and at least one false operation. The control circuit 112b is configured to receive the operation results generated by the operating circuit 112a in sequence. The control circuit 112b is configured to provide a first portion of the operation results corresponding to the decryption operations to the operating circuit 112a, and to prevent a second portion of the operation results corresponding to the at least one false operation from being provided to the operating circuit 112a.

In one embodiment, the operating circuit 112a includes a multiplexer MTC and a multiplier MUX. The first input end of the multiplexer MUX is electrically connected to the output end of a register REG in the control circuit 112b and the input end of an input value. The second input end of the multiplexer MUX is configured to receive the encrypted data N. The control end of the multiplexer MUX is configured to receive a control signal CS. The output end of the multiplexer MUX is electrically connected to a first input end of the multiplier MTC. The multiplexer MUX is configured to output the received input value or the received encrypted data N as an output of multiplexer according to the RSA private key. When a decryption multiplication operation or a first false multiplication operation is performed, the multiplexer MUX outputs the encrypted data N as the output of multiplexer. When a decryption square operation or a first false square operation is performed, the multiplexer MUX outputs the input value as the output of multiplexer.

The second input end of the multiplier MTC is electrically connected to the output end of the register REG and the input end of the encrypted data N. The multiplier MTC is configured to perform a multiplication operation on the input value and the output of multiplexer to generate an output of multiplier.

The control circuit 112b includes a register REG and a controller CTL. The register REG is configured to temporarily store the output of multiplier, and selectively provides the output of multiplier to the multiplexer MUX and the multiplier MTC to serve as a new input value (e.g., a new input value in a next period).

The controller CTL is electrically connected to the register REG, and is configured to provide an operating signal OPS to the register REG, so as to make the register REG selectively provide the output of multiplier to the multiplexer MUX and the multiplier MTC according to the operating signal OPS. For example, in a first operating state, the controller CTL prevents the register REG from providing the output of multiplier to the operating circuit 112a by the operating signal OPS, and in a second operating state, the controller CTL controls the register REG to provide the output of multiplier to the operating circuit 112a by the operating signal OPS.

Figure 3:
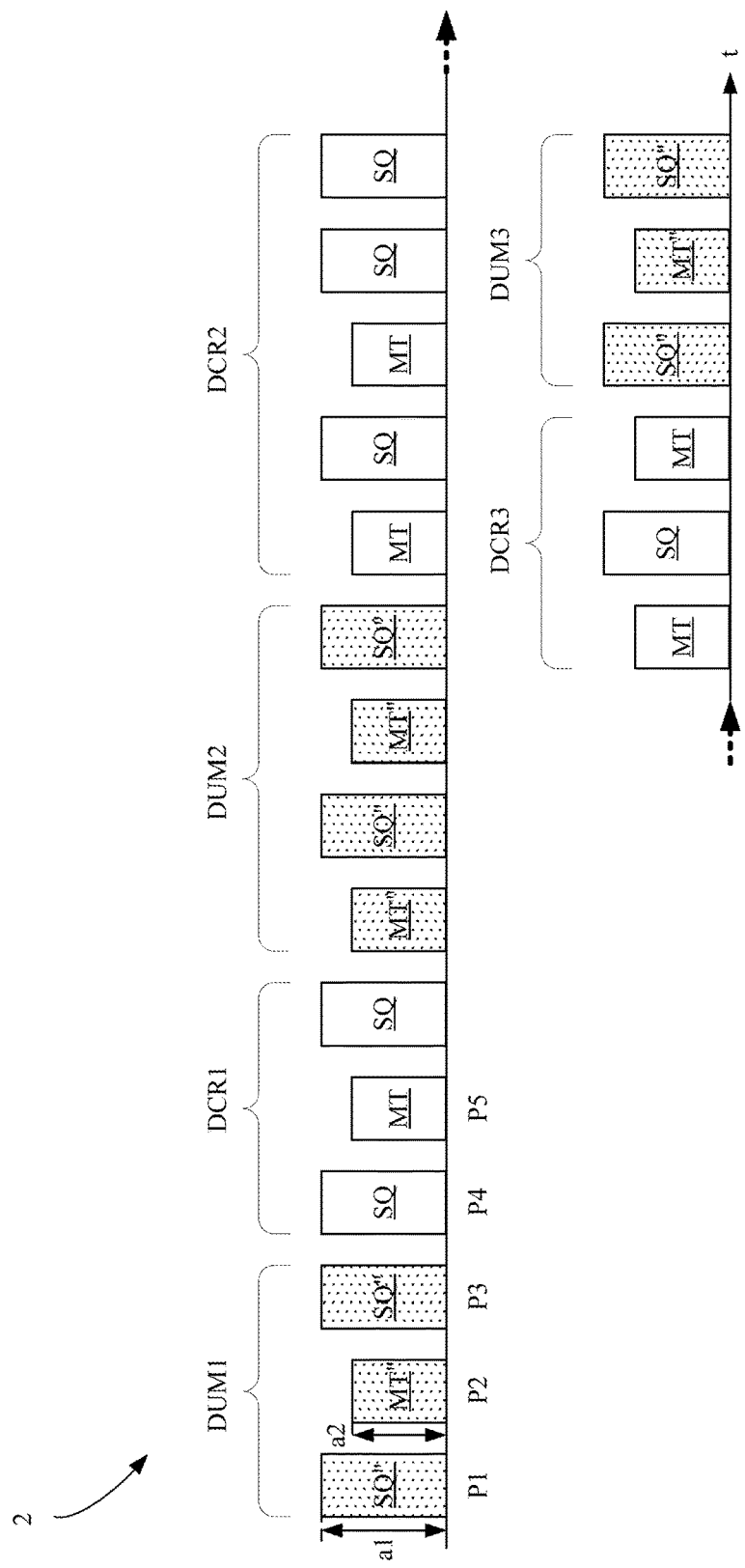
FIG. 3 illustrates an operative example of a decryption method in accordance with one embodiment of the present disclosure.

For example, referring to both FIGS. 3 and 4, in period P1, the input values are N. The multiplexer MUX selects the input value as the output of multiplexer according to the control signal CS. The multiplier MTC outputs N^2 as a first output of multiplier. The controller CTL controls the register REG to maintain an original value (e.g., a NULL value) by the operating signal OPS, so as to provide the original value in a next period (e.g., in period P2).

In period P2, since the output of the register REG is the original value, the input value is maintained as N. The multiplexer MUX selects the encrypted data N as the output of multiplexer according to the control signal CS. The multiplier MTC outputs N^2 as a second output of multiplier. The controller CTL controls the register REG to maintain the original value through the operating signal OPS, so as to provide the original value in a next period.

The operations in period P3 are similar to the operations in period P1, and therefore, a description in this regard is not repeated herein.

In period P4, since the output of the register REG is the original value, the input value is N. The multiplexer MUX selects the input value as the output of multiplexer according to the control signal CS. The multiplier MTC outputs N^2 as a fourth output of multiplier. The controller CTL controls the register REG to temporarily store the fourth output of multiplier by the operating signal OPS, so that the fourth output of multiplier is provided as the input value in a next period.

In period P5, the input values of the multiplexer MUX and the multiplier MTC are N^2. The multiplexer MUX selects the encrypted data N as the output of multiplexer according to the control signal CS. The multiplier MTC outputs N^3 as a fifth output of multiplier. The controller CTL controls the register REG to temporarily store the fifth output of multiplier by the operating signal OPS, so that the fifth output of multiplier is provided as the input value in a next period. The rest may be deduced by analogy.

Based on the operations described above, it is difficult for an attacker to acquire the operations in the decryption procedure and the corresponding RSA private key through measuring a relevant signal of the decryption device 100.

In some embodiments of the present disclosure, the decryption component 110 may perform at least one second false operation according to the encrypted data N when performing the decryption operations. In one embodiment, the decryption component 110 performs at least one second false square operation according to the encrypted data N when performing the decryption multiplication operations of the decryption operations. In one embodiment, the decryption component 110 performs at least one second false multiplication operation according to the encrypted data N when performing the decryption square operations of the decryption operations.

In one embodiment, the calculation result of the second false square operation or the calculation result of the second false multiplication operation is not used in generating the decrypted data.

In one embodiment, during the decryption procedure, the number of times that the second false multiplication operation is performed is equal to or less than the number of times that the decryption square operation is performed. Similarly, in one embodiment, during the decryption procedure, the number of times that the second false square operation is performed is equal to or less than the number of times that the decryption multiplication operation is performed.

Figure 5:
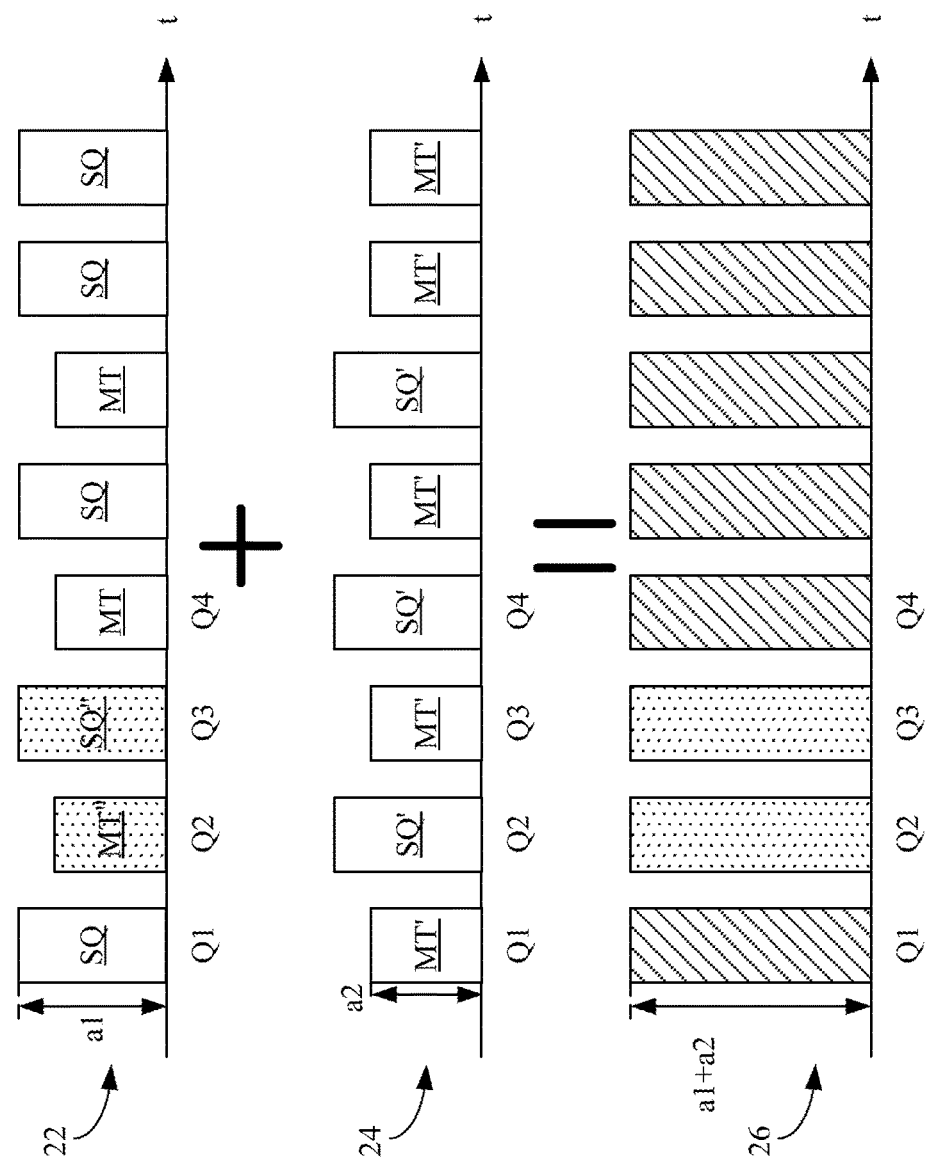
FIG. 5 illustrates an operative example of a decryption method in accordance with another embodiment of the present disclosure.

Referring to FIG. 5, in some embodiments of the present disclosure, the decryption component 110 performs at least one second false operation concurrent with the decryption operations and the first false operations. That is, the decryption component 110 may perform an operation sequence 22 with a first false square operation SQ" and a first false multiplication operation MT" inserted therein. The decryption component 110 may perform an operation sequence 24 concurrent with the operation sequence 22, so that a corresponding second false multiplication operation MT' is performed concurrent with at least one of a decryption square operation SQ and the first false square operation SQ", and a corresponding second false square operation SQ' is performed concurrent with at least one of a decryption multiplication operation MT and the first false multiplication operation MT'". In such a manner, in the decryption procedure, an attacker can merely acquire the operation sequence 26, and it is difficult for the attacker to identify the RSA private key.

Figure 6:
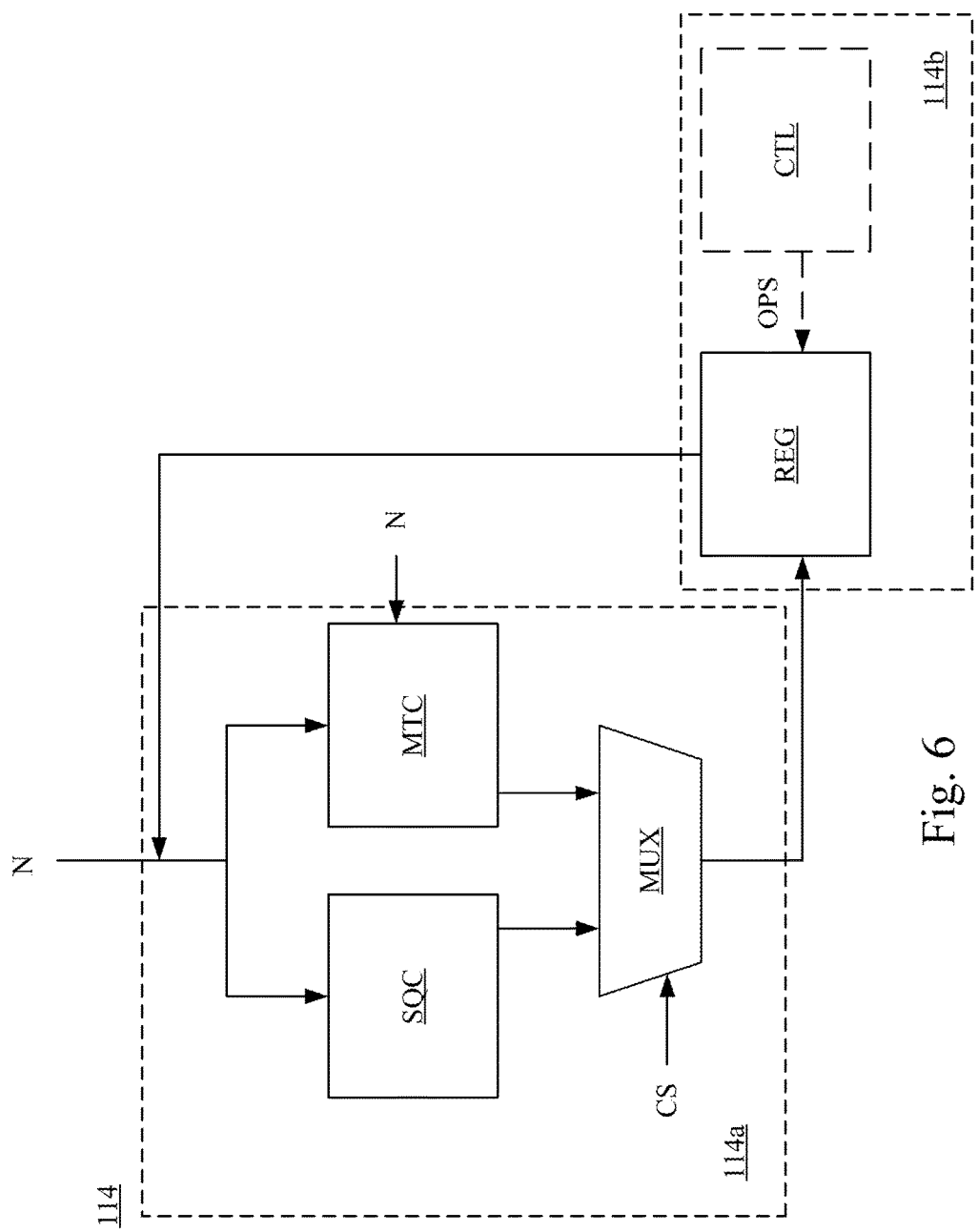
FIG. 6 is a schematic block diagram of a decryption circuit in accordance with another embodiment of the present disclosure.

In one embodiment of the present disclosure, the decryption component 110 may include a decryption circuit 114 (as shown in FIG. 6) to perform the decryption procedure described above. The decryption circuit 114 includes an operating circuit 114a and a control circuit 114b. The operating circuit 114a includes a squarer SQC, a multiplier MTC, and a multiplexer. The components and the functions of the control circuit 114b are similar to the components and the functions of the control circuit 112b shown in FIG. 4.

The input end of the squarer SQC is electrically connected to the output end of the control circuit 114b and an input end of an input value. The output end of the squarer SQC is electrically connected to the first input end of the multiplexer MUX. The first input end of the multiplier MTC is electrically connected to the output end of the control circuit 114b and an input end of the encrypted data N. The second input end of the multiplier MTC receives the encrypted data N, and the output end of the multiplier MTC is electrically connected to the second input end of the multiplexer MUX.

The squarer SQC is configured to generate an output of squarer according to an input value. The input value may be the encrypted data N or the output of the control circuit 114b. The multiplier MTC is configured to perform a decryption multiplication operation or a second false multiplication operation with the input value and the encrypted data N to generate an output of multiplier. The squarer SQC and the multiplier MTC perform a decryption square operation (or a first false square operation) and a second false multiplication operation concurrently, or perform a second false square operation and a decryption multiplication operation (or a first false multiplication operation) concurrently, so that it is difficult for an attacker to acquire the decryption operations and the corresponding RSA private key through measuring a relevant signal of the decryption device 100.

For example, with reference also to FIG. 5, in period Q1, the input value is N. The squarer SQC performs a decryption square operation and outputs N^2, and concurrently, the multiplier MTC performs a second false multiplication operation and outputs N^2. The multiplexer MUX selects the output of squarer as a first output of multiplexer according to the control signal CS. The controller CTL controls the register REG to temporarily store the first output of multiplexer through the operating signal OPS, so that the register REG provides the first output of multiplexer to the squarer SQC and the multiplier MTC in a next period.

In period Q2, the input value is N^2. The squarer SQC performs a second false square operation and outputs N^4, and concurrently, the multiplier MTC performs a first false multiplication operation and outputs N^3. The controller CTL controls the register REG to maintain the first output of multiplexer, so that the register REG provides the first output of multiplexer to the squarer SQC and the multiplier MTC in a next period. The operations in periods Q3, Q4 can be deduced by analogy. Through such operations, it is difficult for an attacker to acquire the decryption operations and the corresponding RSA private key through measuring a relevant signal of the decryption device 100.

Although the present invention has been described in considerable detail with reference to certain embodiments thereof, other embodiments are possible. Therefore, the scope of the appended claims should not be limited to the description of the embodiments contained herein.

What is claimed is:

1. A decryption method comprising:
    receiving encrypted data, wherein the encrypted data is encrypted according to an RSA public key; and
    performing a plurality of operations in sequence, according to an RSA private key and the encrypted data, to acquire a decrypted data;
    wherein the operations comprise a plurality of decryption operations and at least one false operation, the decryption operations comprise at least one decryption multiplication operation and at least one decryption square operation, and the at least one false operation comprises at least one of at least one first false multiplication operation and at least one first false square operation;
    wherein at least one second false square operation is performed when the at least one decryption multiplication operation or the at least one first false multiplication operation is performed;
    wherein a binary form of the RSA private key comprises a plurality of bits, and a number of times that the at least one second false square operation is performed corresponds to a sum of a number or "1's" in the binary form of the RSA private key and a number of times that the at least one first false multiplication operation is performed.

2. The decryption method as claimed in claim 1, wherein the at least one decryption square operation or the at least one first false square operation is performed between two decryption multiplication operations.

3. The decryption method as claimed in claim 1, wherein the at least one decryption square operation or the at least one first false square operation is performed between one of the at least one decryption multiplication operation and one of the at least one first false multiplication operation.

4. The decryption method as claimed in claim 1, wherein a calculation result of the first false square operation or a calculation result of the first false multiplication operation is not used in generating the decrypted data.

5. The decryption method as claimed in claim 1, wherein at least one second false multiplication operation is performed when the at least one decryption square operation or the at least one first false square operation is performed.

6. The decryption method as claimed in claim 5, wherein a number of times the at least one second false multiplication operation is performed corresponds to a sum of a binary bit length of the RSA private key and a number of times that the at least one first false square at operation is performed.

7. A decryption device comprises:
    a communication module; and
    a decryption component configured for:
        receiving, through the communication module, encrypted data, wherein the encrypted data is encrypted according to an RSA public key;
        performing a plurality of operations in sequence, according to an RSA private key and the encrypted data, to acquire a decrypted data, wherein the operations comprise a plurality of decryption operations and at least one false operation, the decryption operations comprise at least one decryption multiplication operation and at least one decryption square operation, and the at least one false operation comprises at least one of at least one first false multiplication operation and at least one first false square operation; and
        performing at least one second false multiplication operation when the at least one decryption square operation or the at least one first false square operation is performed;
        wherein a number of times the at least one second false multiplication operation is performed corresponds to a sum of a binary bit length of the RSA private key and a number of times that the at least one first false square operation is performed.

8. The decryption device as claimed in claim 7, wherein the at least one decryption square operation or the at least one first false square operation is performed between two decryption multiplication operations.

9. The decryption device as claimed in claim 7, wherein the at least one decryption square operation or the at least one first false square operation is performed between one of the at least one decryption multiplication operation and one of the at least one first false multiplication operation.

10. The decryption device as claimed in claim 7, wherein a calculation result of the first false square operation or a calculation result of the first false multiplication operation is not used in generating the decrypted data.

11. The decryption device as claimed in claim 7, wherein the decryption component is further configured for:

performing at least one second false square operation when the at least one decryption multiplication operation or the at least one first false multiplication operation is performed.

12. The decryption device as claimed in claim 11, wherein a binary form of the RSA private key comprises a plurality of bits, and a number of times that the at least one second false square operation is performed corresponds to a sum of a number of "1's" in the binary form of the RSA private key and a number of times that the at least one first false multiplication operation is performed.

13. A decryption circuit comprising:

an operating circuit configured for performing a plurality of operations in sequence according to an RSA private key and encrypted data to generate a plurality of operation results, wherein the operations comprise a plurality of decryption operations and at least one false operation, the decryption operations comprise at least one decryption multiplication operation and at least one decryption square operation, and the at least one false operation comprises at least one first false multiplication operation and at least one first false square operation, wherein the at least one first false multiplication operation does not overlap with the at least one decryption square operation or with the at least one first false square operation, or the at least one first false square operation does not overlap with the at least one decryption multiplication operation or with the at least one first false multiplication operation; and a control circuit configured for receiving the operation results in sequence, providing a first portion of the operation results of the decryption operations to the operating circuit, and preventing a second portion of the operation results of the at least one false operation from being provided to the operating circuit.

14. The decryption circuit as claimed in claim 13, wherein the operating circuit comprises:

a multiplexer configured for receiving an input value and the encrypted data, and outputting one of the input value and the encrypted data as an output of multiplexer according to the RSA private key; and a multiplier configured for receiving the input value and the output of multiplexer, and performing one of the at least one decryption multiplication operation with the input value and the output of multiplexer to generate a first operation result of the operation results.

15. The decryption circuit as claimed in claim 13, wherein the control circuit comprises:

a register configured for receiving the first operation result; and a controller configured for controlling the register so that the register selectively provides the first operation result to the operating circuit, wherein in a first operating state, the controller prevents the register from providing the first operation result to the operating circuit, and in a second operating state, the controller controls the register to provide the first operation result to the operating circuit.

16. The decryption circuit as claimed in claim 13, wherein the operating circuit is further configured for performing at least one second false square operation when the at least one decryption multiplication operation or the at least one first false multiplication operation is performed, or at least one second false multiplication operation when the at least one decryption square operation or the at least one first false square operation is performed.

* * * * *